United States Patent
Davies et al.

(10) Patent No.: US 10,528,131 B2
(45) Date of Patent: Jan. 7, 2020

(54) METHOD TO RELIABLY DETECT CORRELATIONS BETWEEN GAZE AND STIMULI

(71) Applicant: Tobii AB, Danderyd (SE)

(72) Inventors: Alexander Davies, Danderyd (SE); Maria Gordon, Danderyd (SE); Per-Edvin Stoltz, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 15/981,629

(22) Filed: May 16, 2018

(65) Prior Publication Data

US 2019/0354172 A1 Nov. 21, 2019

(51) Int. Cl.
*G06F 3/01* (2006.01)
(52) U.S. Cl.
CPC ..................... *G06F 3/013* (2013.01)
(58) Field of Classification Search
None
See application file for complete search history.

(56) References Cited

U.S. PATENT DOCUMENTS

| | | | | |
|---|---|---|---|---|
| 4,835,686 A | * | 5/1989 | Furuya | G06F 3/0601 711/113 |
| 6,006,022 A | * | 12/1999 | Rhim | G06F 17/5027 703/26 |
| 6,204,828 B1 | * | 3/2001 | Amir | G06F 3/013 345/156 |
| 7,113,170 B2 | | 9/2006 | Lauper et al. | |

(Continued)

FOREIGN PATENT DOCUMENTS

WO 2017/216118 A1 12/2017

OTHER PUBLICATIONS

Ken Pfeuffer, et. al.: "Pursuit Calibration", Proceedings of the 26th Annual ACM Symposium on User Interface Software and Technology, UIST '13, Oct. 8, 2013 (Oct. 8, 2013), pp. 261-270, XP055202298, New York, New York, USA DOI: 10.1145/2501988.2501998 ISBN: 978-1-45-032268-3 pp. 261-263; figures 1,2.

(Continued)

*Primary Examiner* — Chad M Dicke
(74) *Attorney, Agent, or Firm* — Samuel I. Yamron

(57) ABSTRACT

A system and techniques for calibrating an eye tracking system are described. The system can update the calibration of personal calibration parameters continuously based on a user's gaze on a user interface, following user interface stimulus events. The system improves continuous calibration techniques by determining an association between the user's eye sequences and the stimulus events, and updates the personal calibration parameters accordingly. A record indicative of a user gaze, including eye sequences, such as eye movements or eye fixations, is maintained over a time period. A user interface stimulus event associated with the user interface and occurring within the time period is detected. An association is determined between the eye sequence and the user interface stimulus event. An interaction observation that includes the eye sequence and a location of the stimulus event is generated. Personal calibration parameters are updated based on the interaction observation.

19 Claims, 11 Drawing Sheets

(56) References Cited

U.S. PATENT DOCUMENTS

| | | | |
|---|---|---|---|
| 7,594,046 B2* | 9/2009 | Gangwal | G06F 5/10 382/162 |
| 9,619,020 B2 | 4/2017 | George-Svahn et al. | |
| 10,016,131 B2* | 7/2018 | Liu | A61B 3/032 |
| 2005/0047629 A1* | 3/2005 | Farrell | G06F 3/013 382/117 |
| 2005/0114612 A1* | 5/2005 | Bombal | G11C 29/003 711/154 |
| 2005/0198512 A1* | 9/2005 | Kline | G06F 21/604 713/182 |
| 2006/0242295 A1* | 10/2006 | Husemann | G06F 19/3481 709/224 |
| 2007/0011609 A1* | 1/2007 | Adjouadi | G06F 3/013 715/700 |
| 2013/0169560 A1* | 7/2013 | Cederlund | G06F 3/013 345/173 |
| 2014/0191927 A1* | 7/2014 | Cho | G02B 27/017 345/8 |
| 2014/0226131 A1 | 8/2014 | Lopez | |
| 2014/0247232 A1 | 9/2014 | George-Svahn et al. | |
| 2014/0361996 A1 | 12/2014 | Eden | |
| 2014/0368442 A1* | 12/2014 | Vahtola | G06F 3/013 345/173 |
| 2016/0128568 A1* | 5/2016 | Bellamy | A61B 3/113 351/209 |
| 2017/0031433 A1* | 2/2017 | Abou Mahmoud | G06F 3/013 |
| 2017/0160813 A1* | 6/2017 | Divakaran | G06F 3/017 |
| 2017/0290504 A1* | 10/2017 | Khaderi | A63F 13/212 |

OTHER PUBLICATIONS

International Search Report and Written Opinion dated Jan. 25, 2019 in related PCT matter No. PCT/US2018/032929, 112 pgs.

* cited by examiner

METHOD TO RELIABLY DETECT CORRELATIONS BETWEEN GAZE AND STIMULI

TECHNICAL FIELD

The present application relates to gaze detection systems and methods. In an example, such systems and methods rely on personal calibration parameters for an eye model, or deep learning model, to ensure that a target of the user gaze is accurately inferred from observations of the user's eye.

BACKGROUND

Interaction with computing devices is a fundamental act in today's world. Computing devices, such as personal computers, tablets, smartphones, are found throughout daily life. In addition, computing devices that are wearable, such as wearable headset devices (e.g., virtual reality headsets and augmented reality headsets), are becoming increasingly popular. The systems and methods for interacting with such devices define how they are used and what they are used for.

Advances in eye tracking technology have made it possible to interact with a computing device using a person's gaze information. In other words, the location on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, United States Patent Application Publication 20130169560, U.S. Pat. No. 7,113,170, United States Patent Application Publication 20140247232, and U.S. Pat. No. 9,619,020. The full specification of these patents and applications are herein incorporated by reference.

In order to ensure that a target of the user gaze is accurately inferred from observations of the user's eye, calibration of an eye model, such as a deep learning-based model or pupil center cornea reflection (PCCR) model, is necessary. Note that the terms "eye model" and "personal calibration parameters" will be used herein to refer to parameters to calibrate eye tracking systems, where these parameters can be personalized to a user of the eye tracking system. This can include an eye model such as PCCR, a machine learning or deep learning system, or another model.

For example, a 5-, 7-, or 9-point pattern can be used to obtain a thorough calibration of personal calibration parameters, such as pupil and foveal offset. However, over time, the personal calibration parameters generated from such an initial calibration become less applicable as the user's eye changes (e.g., pupil size changes) due to changes in lighting, eye fatigue, etc. For example, a pupil offset can change when the pupil size changes, and the cornea shape shifts throughout the day.

As a result, the gaze computed based on existing calibration parameters becomes progressively less accurate, and the model requires recalibration. One method to correct for this is to prompt the user to do a complimentary manual calibration, similar to the initial calibration. However, this is inconvenient and disruptive for the user, as other applications must be interrupted while a full multi-point calibration process is performed.

SUMMARY

One embodiment of the present disclosure provides a system and method for calibrating an eye tracking system. During operation, the system updates a record indicative of a user gaze on a user interface over a time period, the user interface associated with the eye tracking system, the record including an eye sequence. The system detects a user interface stimulus event occurring within the time period and associated with the user interface. The system then determines, based on the record, an association between the eye sequence and the user interface stimulus event. The system then generates, based on the association, a first interaction observation that includes at least the eye sequence and a location of the user interface stimulus event associated with the user interface. Finally, the system updates personal calibration parameters for tracking the user gaze based on the first interaction observation.

In one embodiment, while determining the association between the eye sequence and the user interface stimulus event, the system determines, based on a type of the user interface stimulus event, a user gaze time interval within the time period of the record. The system identifies, from the record, that the eye sequence occurred during the user gaze time interval. The system then determines the association based on the identifying of the eye sequence.

In one embodiment, while identifying the eye sequence associated with the stimulus event, the system can identify, from the record, that the user gaze was stable during an eye fixation time interval within the time period of the record. In this embodiment, the user gaze can include a fixated gaze, i.e., a filtered stable signal. Alternatively, while identifying the eye sequence associated with the stimulus event, the system can identify, from the record, that a pattern of the eye sequence corresponded to a movement pattern of the user interface stimulus event. In this embodiment, the user interface stimulus event can include a moving stimulus.

In one embodiment, while determining the user gaze time interval, the system determines, based on a type of the application, an expected type of candidate user interface stimulus events. The system then determines that the type of the user interface stimulus event is the expected type.

In one embodiment, the system generates a personal calibration parameter update decision based on an outcome of performing an update check. The update check can use at least the first interaction observation. The update check can involve one or more of: Random Sample Consensus (RANSAC); Maximum Likelihood Estimate Sample Consensus (MLESAC); Maximum A Posteriori Sample Consensus (MAPSAC); a KALMANSAC procedure; and machine learning.

In one embodiment, the system generates a personal calibration parameter update decision by accessing a set of at least four interaction observations comprising locations of stimulus events and eye sequences, the set including the first interaction observation and a second interaction observation, the second interaction observation comprising a second location of a second stimulus event and a second eye sequence. The system then selects the second interaction observation from the set. The system then constructs trial personal calibration parameters based on the second interaction observation, such that a gaze target projected for the second eye sequence using the trial personal calibration parameters falls proximate to the second location. The system then projects gaze targets for remaining interaction observations in the set based on the trial personal calibration parameters and the eye sequences of the remaining interaction observations. The system then detects an inlier subset of the remaining interaction observations, such that a respective projected gaze for a respective inlier falls within a first threshold value from the location of the respective inlier.

The system then detects an outlier subset of the remaining interaction observations, such that a respective projected gaze for a respective outlier falls greater than the first threshold value from the location of the respective outlier. The system then computes a ratio of a number of inliers to a number of outliers. Responsive to the ratio being greater than a second threshold value, the system then generates a decision to update the personal calibration parameters. Responsive to the ratio being within the second threshold value, the system then discards the trial personal calibration parameters and constructs second trial personal calibration parameters based on a second set of interaction observations.

In one embodiment, while updating the personal calibration parameters, the system determines a difference between the trial personal calibration parameters and the personal calibration parameters. Responsive to the difference being greater than a third threshold value, the system then replaces the personal calibration parameters with the trial personal calibration parameters. Responsive to the difference being within the third threshold value, the system then keeps the personal calibration parameters.

In one embodiment, the eye sequence includes one or more of: an eye fixation of the user; and an eye movement of the user. The eye fixation can correspond to a fixated gaze, i.e., a filtered stable signal.

In one embodiment, the user interface stimulus event includes one or more of: a user mouse click; a user screen tap; a user selection; a user keyboard input; a user joystick or game pad input; a user hand controller input; a displayed cursor; a displayed icon; a displayed notification; and a displayed animation.

In one embodiment, the location of the associated stimulus event is two-dimensional or three-dimensional.

In one embodiment, the record is stored in a circular buffer.

In one embodiment, a size of the circular buffer depends on a type of application presenting the user interface stimulus event.

In one embodiment, upon updating the personal calibration parameters, the system deletes a record of the first interaction observation.

In one embodiment, the association is determined based on a timestamp or a confidence measure in the record.

In one embodiment, while updating the personal calibration parameters, the system generates the personal calibration parameters without performing an initial calibration.

In one embodiment, detecting the user interface stimulus event further comprises one or more of: copying the record of the user gaze immediately; copying the record of the user gaze after a predetermined time period; copying the record of the user gaze after a variable time period; and suspending changes to the record of the user gaze.

In one embodiment, identifying the eye sequence associated with the stimulus event is based on one or more of: a distance from the location of the stimulus event to a projected gaze for the eye sequence; a duration of the eye sequence; a precision of tracking the eye sequence; and a correlated movement within the eye sequence.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of the present disclosure relate to calibrating an eye tracking system. The system can perform reliable continuous calibration of eye model parameters by calibrating the user's gaze based on input stimuli without a manual calibration process. The system can do so by associating the user's gaze with stimulus events associated with the user interface, while filtering out unreliable events.

More particularly, the calibration samples, including gaze, are stored in a buffer continuously. Candidate gaze fixations and/or movement patterns are thereafter matched to a stimulus to form an interaction observation. These interaction observations can later be used to perform a calibration, improve an existing calibration or to adjust a correction layer.

In various embodiments, the disclosed eye model calibration system and methods can be used across different eye tracking systems including ones integrated with different types of smartphones, tablets, laptops, wearable headset devices (e.g., virtual reality and augmented reality headsets), and standalone eye tracking systems.

These and other features of training and calibrating an eye tracking system are further described herein below. Various components and configurations of eye tracking systems are described herein next to provide a better understanding of the calibration techniques.

Figure 1:
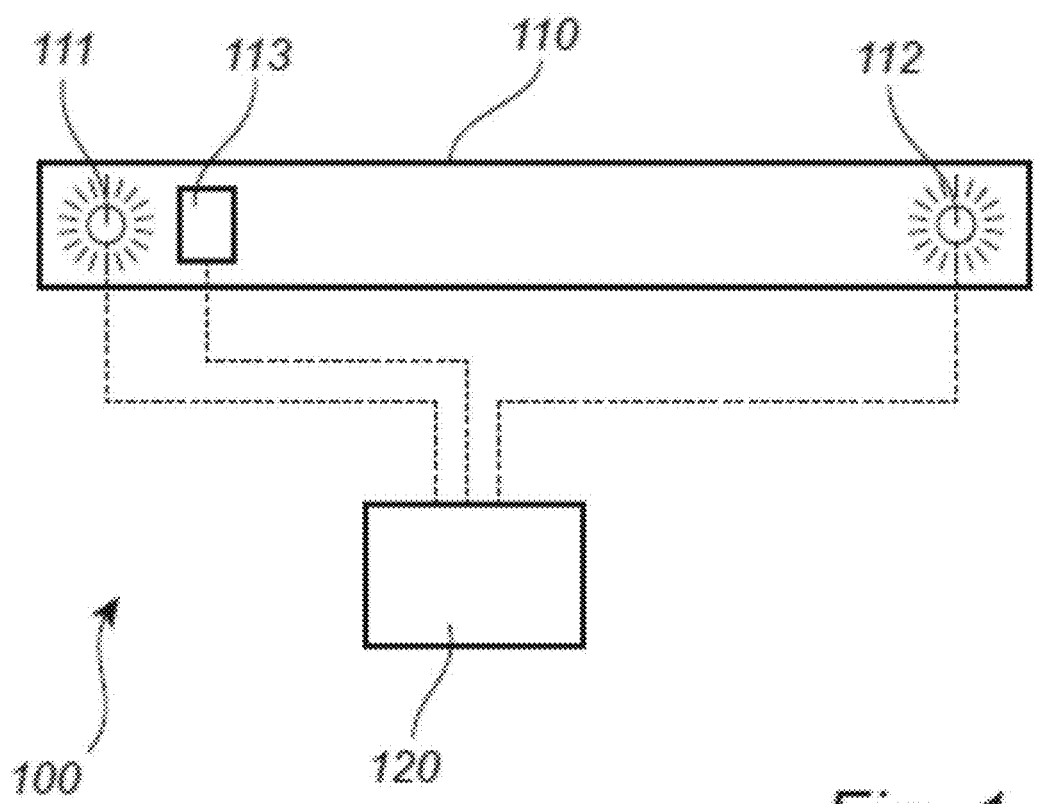
FIG. 1 shows an eye tracking system, according to an embodiment.

FIG. 1 shows an eye tracking system 100 (which may also be referred to as a gaze tracking system), according to an embodiment. The system 100 comprises illuminators 111 and 112 for illuminating the eyes of a user, and an image sensor 113 for capturing images of the eyes of the user. The illuminators 111 and 112 may for example, be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited to be an IR camera or a depth camera or a light-field camera. The shutter mechanism of the image sensor can either be a rolling shutter or a global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example, take turns to illuminate the eye, so that every first image is a bright pupil image, and every second image is a dark pupil image.

The eye tracking system 100 also comprises circuitry 120 (for example including one or more processors) for processing the images captured by the image sensor 113. The circuitry 120 may for example, be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
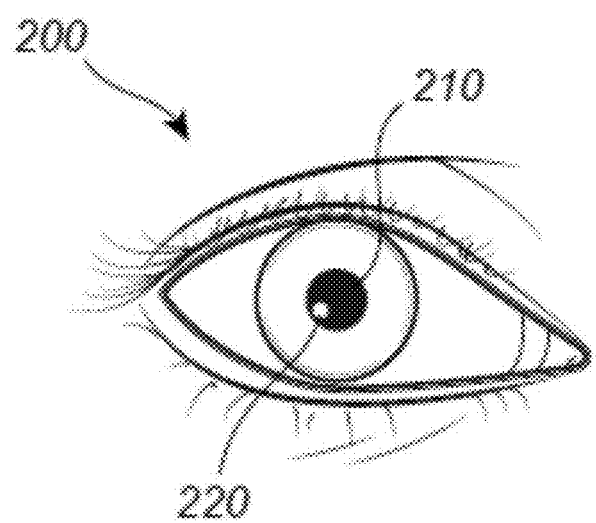
FIG. 2 shows an example of an image of an eye captured by an image sensor, according to an embodiment.

FIG. 2 shows an example of an image of an eye 200, captured by the image sensor 113. The circuitry 120 may for example, employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in virtual reality glasses or augmented reality glasses).

Figure 3:
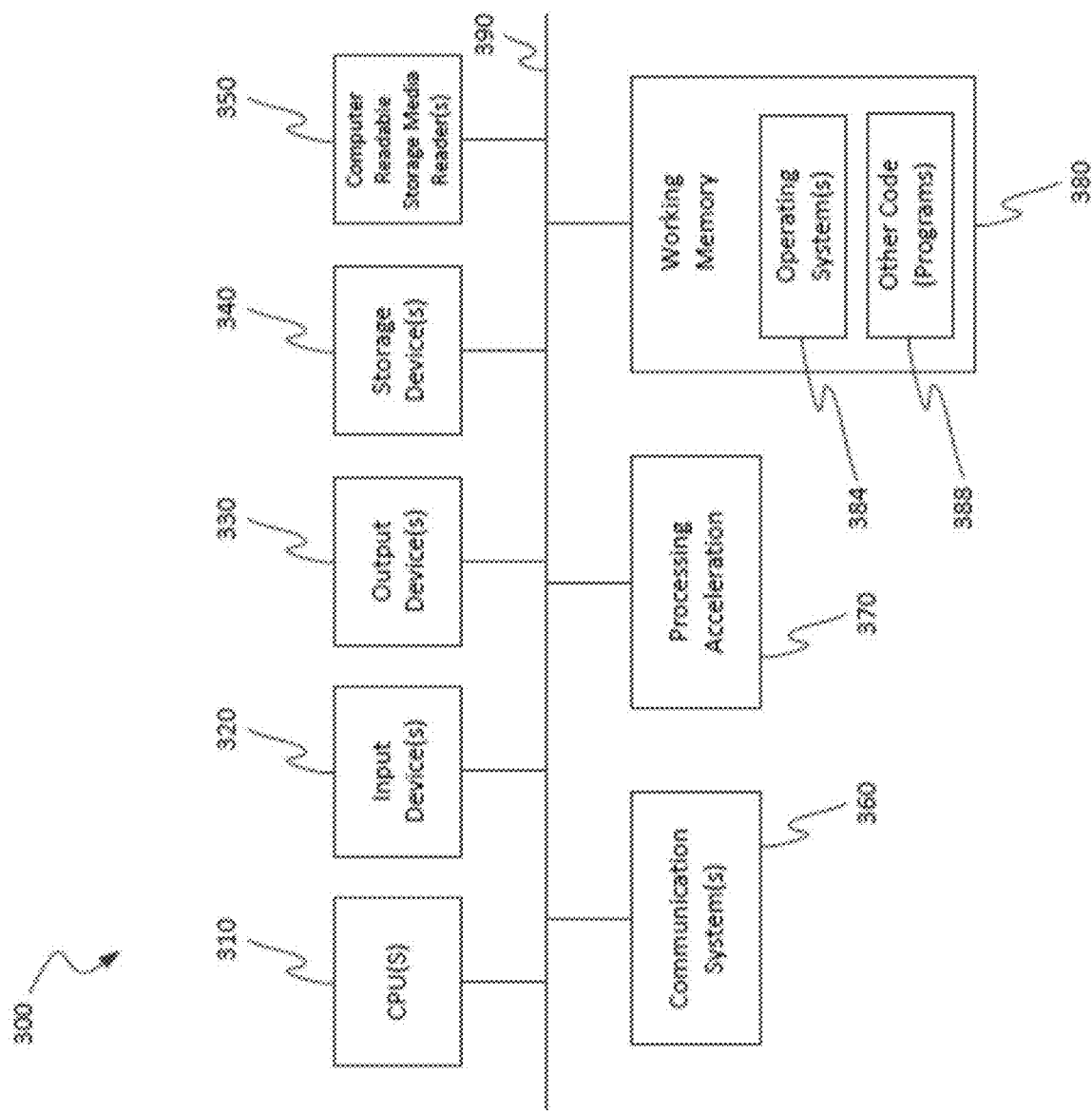
FIG. 3 is a block diagram illustrating a specialized computer system, according to an embodiment.

FIG. 3 is a block diagram illustrating a specialized computer system 300 in which embodiments of the present disclosure may be implemented. This example illustrates a specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above.

In some embodiments, specialized computer system 300 may also include a processing acceleration unit 370, which can include a digital signal processor, a special-purpose processor and/or the like.

Figure 4:
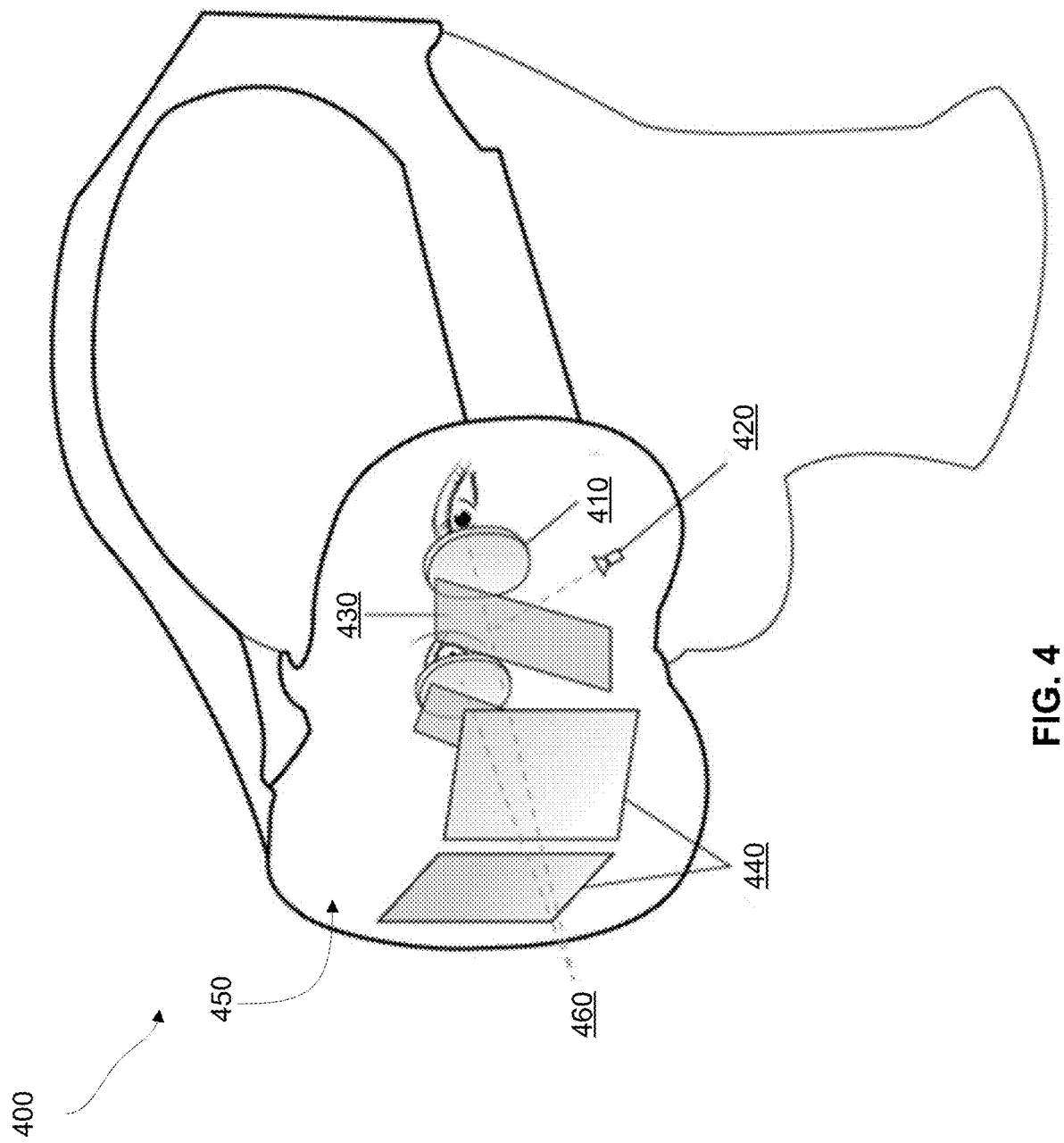
FIG. 4 shows an example of a wearable computing device that implements components of an eye tracking system, according to an embodiment.

FIG. 4 shows an example of a wearable computing device 400 that implements some or all of the above components of an eye tracking system as described in connection with FIGS. 1-2. The wearable computing device 400 can be a VR headset or an AR headset that can be worn by a user. As illustrated, the wearable computing device 400 includes a set of lenses 410, such as Fresnel lenses, a set of cameras 420, a set of hot mirrors 430 (e.g., the set can include two hot mirrors for each eye in various embodiments), and a set of displays 440. The camera 420 can include the image sensors 113 of FIG. 1. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three dimensional virtual or real space.

Figure 5B:
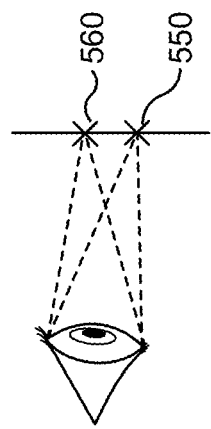
FIG. 5B illustrates the effect of personal calibration parameter calibration.
Figure 5A:
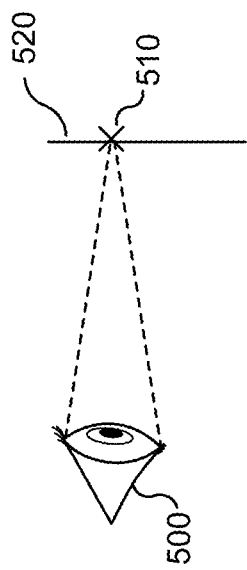
FIG. 5A illustrates an example of a gaze projected from an eye sequence, according to an embodiment.

FIG. 5A illustrates an example of a gaze projected from an eye sequence, according to an embodiment. In this example, a user's eye 500 gazes at a target 510 on a user interface 520. Interface 520 can be a 2D display or a stereoscopic or 3D interface, such as displays 440 in wearable computing device 400 shown in FIG. 4. The eye tracking system such as system 100 in FIG. 1 or the one integrated with the wearable computing device 400, uses an eye model to project the user's gaze to target 510.

FIG. 5B illustrates the effect of personal calibration parameter calibration. In order to ensure that a target of the user gaze is accurately inferred from observations of the user's eye, calibration of an eye model, such as a pupil center cornea reflection (PCCR) model, is necessary. Note that the present disclosure is not limited to a PCCR eye model, and an eye model, such as a PCCR eye model, is one example of personal calibration parameters used by the system. The terms "eye model," "eye model parameters," and "personal calibration parameters" will be used herein to refer to parameters to calibrate the eye tracking system, where these parameters can be personalized to a user of the eye tracking system. In various embodiments, this can include: an eye model such as PCCR; a machine learning or deep learning architecture such as a deep neural network, deep belief network, or recurrent neural network; or any other model now known or later developed. In the deep learning case, the parameters can be parameters to a fully connected layer.

In particular, since there are large variations among people, the eye tracking system may advantageously adjust the personal calibration parameters, such as pupil and foveal offset, to match the user's eyes. In this example, the system may determine that the user is gazing at either target 550 or target 560, depending on the calibration of the eye model parameters. For example, the system could erroneously determine that the user is gazing at target 550 based on a miscalibration, when the user is really viewing target 560. Thus, it is advantageous that the system ensures the eye model parameters are correct for a given user, for example via a multi-point calibration procedure, in order to accurately project the user gaze.

However, over time, the eye model generated from an initial calibration becomes less applicable as the user's eye changes (e.g., pupil size changes) due to changes in lighting, eye fatigue, etc. In particular, the pupil offset changes when the pupil size changes, and the cornea shape shifts throughout the day. As a result, the gaze computed based on existing calibration parameters becomes progressively less accurate, and the model requires recalibration. Typically, a calibration that remains capable of predicting gaze location accurately to within 1-2° would be adequate, whereas an error greater than about 2.5° would necessitate recalibration. One method to correct this problem is to prompt the user to do a complementary manual calibration, similar to the initial calibration. However, this is inconvenient and disruptive for the user, as the user must defer other applications while a full multi-point calibration process is performed.

Herein next, the use of an eye tracking calibration system is described. In the interest of clarity of explanation, this system is described in connection with a camera, a screen, and two user eyes (e.g., the camera captures images, some or all of which show the two user eyes). The eye tracking calibration system can be used with an arbitrary camera and screen configuration for eye tracking that uses visible light, passive infrared, active bright-pupil (BP) infrared, and the like. However, the embodiments of the present disclosure are not limited as such. For example, the embodiments similarly apply to an eye tracking system that uses one camera per user eye, such as in the context of a virtual reality headset or an augmented reality headset. Changes to how the eye tracking calibration system is implemented for a one camera per eye tracking should be apparent to one skilled in the art in light of the present disclosure.

The disclosed system and methods improve over existing calibration techniques by providing eye model recalibration techniques that filter out unreliable stimuli, and correlate stimuli with user gaze to improve the accuracy of unobtrusive calibration. The system can perform a number of steps to increase confidence in this correlation and reduce uncertainty. In various embodiments, the disclosed system and methods can be used either with or without a prior personal calibration by a given user. During operation, the system identifies sequences of selected gaze data as candidate calibration eye sequences, which are generally associated with user interface stimulus events.

Figure 6:
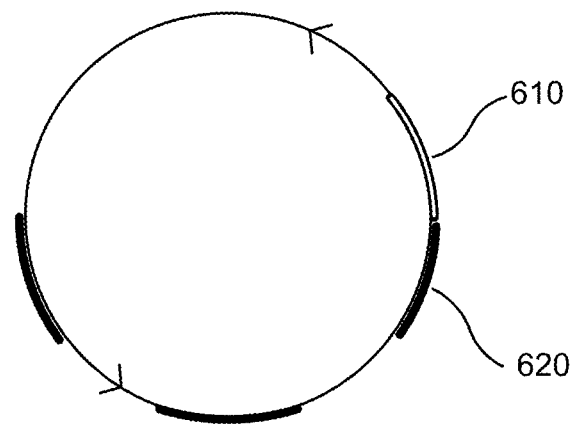
FIG. 6 illustrates an example of a circular buffer for storing a user gaze, according to an embodiment.

To identify a candidate calibration sequence, the system first maintains and updates calibration samples, such as user gaze, in a record stored in memory, such as in a circular buffer. FIG. 6 illustrates an example of a circular buffer 600 for storing a record of user gaze, according to an embodiment. Using a circular buffer allows the system to reuse the buffer in order to save memory. Note that other types of buffer are also possible, and are not limited by the present disclosure. The stored calibration samples may include any of the following: gaze data; timestamps; and a confidence measure. The buffer, such as circular buffer 600, can be maintained in transitory or non-transitory memory or storage.

The system can use the record to identify a plurality of interaction observations, which can each include a user eye sequence and a user interface stimulus event. A respective interaction observation indicates an association between the eye sequence and stimulus event. In this example, circular buffer 600 stores user mouse reference 610, which can include an event performed by a user via a mouse (e.g., a right click, a double-clicks, etc.), and a location on the user interface where this event was detected. Circular buffer 600 further stores a number of user eye sequences such as eye sequence 620, such as an eye fixation or movement. Since user mouse reference 610 follows shortly after eye sequence 620, user mouse reference 610 and eye sequence 620 (e.g., an eye fixation), can together form an interaction observation. In various embodiments, the system can determine the association immediately after detecting a user interface stimulus event, or can determine associations periodically (e.g., at a frequency corresponding to the buffer's length) and match multiple stimulus events with multiple user eye sequences.

In some embodiments, the system uses a stimulus activation, or trigger signal, to determine that the user is likely interacting with the stimulus. For example, a stimulus activation can include: a mouse click; keyboard input; joystick movement; game pad or hand controller (VR) input; or a timer (i.e., the timing for which an element has been displayed on the screen). When a stimulus activation such as mouse reference 610 occurs, the system can copy the buffer, e.g. circular buffer 600, for further analysis. In various embodiments, depending on the type of stimulus, the system can: copy the record immediately; copy the record after either a predetermined or variable time period; or suspend changes to the record, i.e. add no new data to the record until it is analyzed. For example, the system can wait a predetermined or variable time period before copying the record if the user eye sequence is expected to follow or lag behind the stimulus event for the particular type of stimulus event. Conversely, the system can copy the record immediately if the user eye sequence is expected to precede the stimulus event, as eye sequence 620 precedes mouse reference 610.

In general, the system can identify stimulus events that result from a cursor (e.g., a mouse cursor) or coordinates of items displayed in the user interface (e.g., an icon on the screen). A user interface stimulus event can include a user-initiated event that would typically attract the user's gaze, such as: a user mouse click; a user screen tap; a user selection; a user keyboard input; a user joystick or game pad input; and/or a user hand controller input. Or the stimulus event can include a displayed event, such as: a displayed cursor; a displayed icon; a displayed notification; and/or a displayed animation. The stimulus may be static or dynamic. Note that a stimulus event can have a known location or position in 2D or 3D.

The type of the stimulus event can typically depend on the application engaged in by the user. For example, if the user is using a web browser, the system can determine that user stimulus events are likely to include clicks on hyperlinks and the eye sequences likely include gazing at advertisements. For a sports video game, the system can determine that stimulus events likely include a ball pass, a goal, etc. In an embodiment, the system can access a list of expected events depending on the underlying application, detect the occurrence of the expected events, and generate the record as applicable.

Figure 7B:
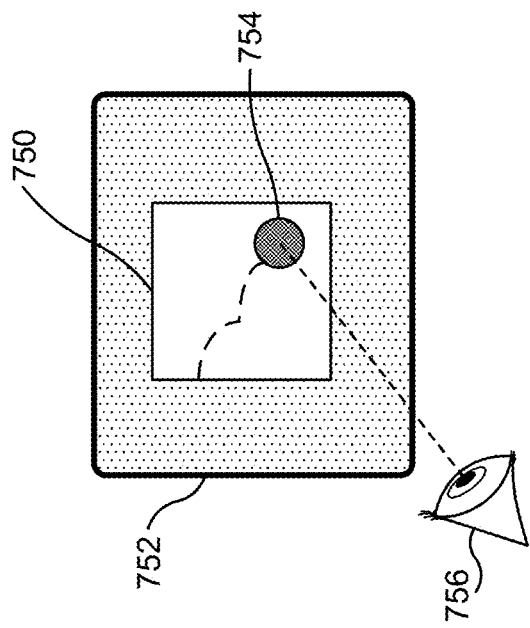
FIG. 7B illustrates an example moving user interface stimulus event, according to an embodiment.
Figure 7D:
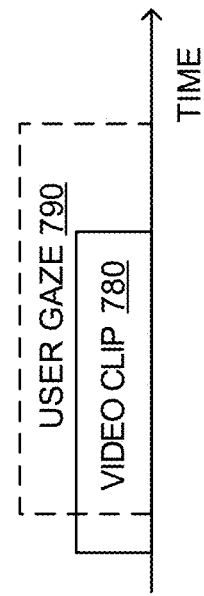
FIG. 7D illustrates an example of a time association between an extended user interface stimulus event and an eye sequence, according to an embodiment.
Figure 7A:
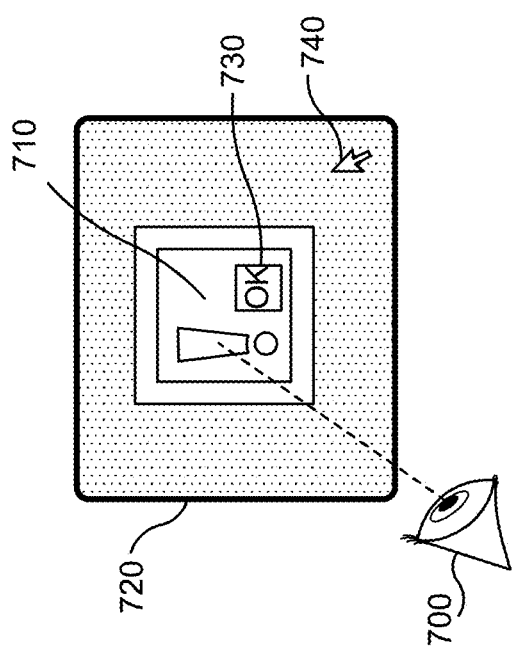
FIG. 7A illustrates an example user interface stimulus event, according to an embodiment.

FIG. 7A illustrates an example user interface stimulus event, according to an embodiment. In this example, the user's eye 700 gazes at the stimulus event, which is a displayed notification 710, such as a dialog box. The system can determine that the user is likely to gaze at notification 710 around the time when notification 710 is displayed on computer monitor 720. Furthermore, notification 710 can be associated with other potential stimulus events. For example, the user is likely to click on button 730 after reading notification 710. In order to select button 730, the user is likely to gaze at mouse cursor 740 and/or button 730 before clicking the mouse. Accordingly, based on timing and other cues, the system can determine an association between an eye sequence and user interface stimulus events, such as those depicted in FIG. 7A.

An eye sequence can include an eye fixation (i.e., a filtered stable signal), which can typically correspond to a fixed or static stimulus event as in the example of FIG. 7A, or an eye movement, which can typically correspond to a moving stimulus event. FIG. 7B illustrates an example moving user interface stimulus event, according to an embodiment. In this example, an animation 750 or video clip can be displayed on computer monitor 752. Animation 750 shows bouncing ball 754. User eye 756 follows the motion of bouncing ball 754, resulting in a moving eye sequence detected by the system. In an embodiment, the system can use a correspondence between a pattern of movement of the user eye sequence and a pattern in the moving stimulus event, to determine an association between the user eye sequence and the stimulus event. Such a correspondence can include a similar pattern of movement, correlated timing, etc., and is not limited by the present disclosure.

The system can search the user gaze record (e.g., the copied circular buffer 600) to identify candidate calibration eye sequences, such as gaze fixations or movements, from the stored gaze data. The system can search using methods such as: time-driven step detections; pattern matching; or clustering of data points. The methods used to identify and select candidate calibration eye sequences, and the type of eye sequences selected, can depend on the nature of the stimulus and activation. In particular, for stationary stimuli the system may identify a collection of eye fixations, whereas for dynamic stimuli the system may select a collection of smooth eye motions or pursuits. Thus, a candidate calibration sequence can include a candidate fixated calibration sequence or candidate moving calibration sequence. For simplicity, all types of eye sequences detectable and selectable from the user gaze record will be referred to as candidate calibration eye sequences.

Having identified candidate calibration eye sequences, the system can match one or more of them to one or more stimulus events to form interaction observations. The system can perform the matching by a weighted function, which can be based on one or more of: distance from stimulus to gaze coordinates; number of frames during fixation or length of matching movement; precision during the eye fixation or movement (e.g. signal to noise ratio); and in the case of dynamic stimulus events, the matching may be based on correlating movement.

Figure 7C:
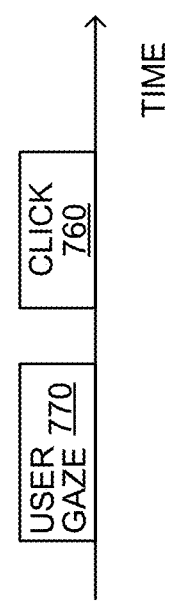
FIG. 7C illustrates an example of a time association between a user interface stimulus event and an eye sequence, according to an embodiment.

The system can also make use of a time association to determine an association between a stimulus and eye sequence. FIG. 7C illustrates an example of a time association between a brief user interface stimulus event 760 (as in the example of FIG. 7A) and an eye sequence 770, according to an embodiment. In this case, user gaze 770 precedes mouse click 760, as a user's gaze typically will focus on the target of a click before the click actually takes place. FIG. 7D illustrates an example of a time association between an extended user interface stimulus event 780 (as in the example of FIG. 7B) and an eye sequence 790, according to an embodiment. In this example, user gaze 790 largely coincides with video clip 780. Depending on the nature of the stimulus event, the system can make use of timing information as in the examples of FIGS. 7C and 7D to determine the association.

Based on the identified interaction observations, the system can generate a decision and/or update check to update parameters of an eye model (which can be an existing or new eye model). In an embodiment, system generates the decision according to a consensus algorithm applied to interaction observations. The eye model update decision and/or update check can be based on one or more of: Random Sample Consensus (RANSAC); Maximum Likelihood Estimate Sample Consensus (MLESAC); Maximum A Posteriori Sample Consensus (MAPSAC); a KALMANSAC procedure; and machine learning.

In a consensus check procedure, such as RANSAC, the system can base the update decision on consistency among eye model parameters fit to different interaction observations, and/or the distance between the interaction observations' respective stimulus event and eye sequence locations. Thus, the interaction observations are considered reliable if there is a consensus among the observations. In an embodiment, the criteria to form a consensus may be based on an observed gaze error of each interaction observation. The system can determine that the gaze errors are consistent if they tend to shift, expand, or shrink parameters of the eye model in a consistent manner. In another embodiment, forming the consensus may be based on the overall calibration residual (optimization error) not increasing.

In an embodiment, the system can perform further reliability checks, such as checking the location distribution of the stimulus events. If the stimulus events are distributed heterogeneously (e.g., concentrated in a corner of the user interface), performing recalibration based on them could bias the eye model to perform well for user gazes in parts of the UI with many interaction observations, and poorly in other areas of the UI. Accordingly, if the system detects that the stimulus event distribution is heterogeneous, it can discard some or all of the interaction observations.

Figure 8:
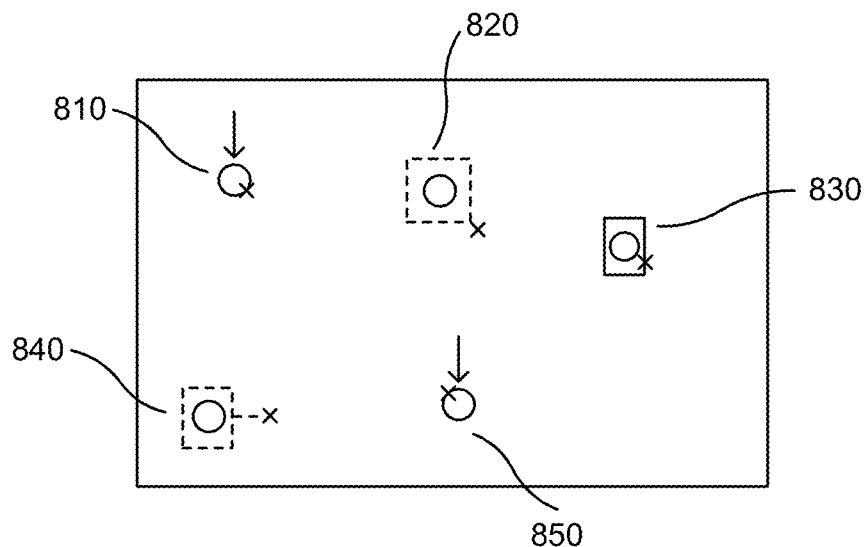
FIG. 8 illustrates proximity between projected gaze and event locations from an exemplary set of interaction observations, according to an embodiment.

In a typical example, the RANSAC update decision can be based on how consistently the eye model parameters predict the gaze location, as measured by distance to the respective user interface stimulus events. FIG. 8 illustrates proximity between projected gaze and event locations from an exemplary set of interaction observations, according to an embodiment. The user interface stimulus events are denoted as circles, and the gaze projected using a trial set of eye model parameters is shown as an X. The eye tracking system can access one or more interaction observations to determine the associated eye sequence and stimulus event. The system then determines gaze information from the eye sequence, and projects the user's gaze from the gaze information according to a trial eye model (i.e., determines a projected location where the gaze would fall according to the trial eye model). The system then computes a distance between the projected gaze location and the stimulus event location indicated in the interaction observation. The strategy of the recalibration is to update the eye model such that the projected gaze and stimulus event are as proximate to each other as possible, thereby minimizing this distance.

In particular, the system can proceed to perform the consensus check process by selecting a subset of the interaction observations. The system can select the subset randomly, or according to any other criteria, and is not limited by the present disclosure. In this example, the system has selected the interaction observations corresponding to event locations 810 and 850. The system then generates a trial eye model such that the selected interaction observations have projected gazes (based on the trial eye model) proximate to the locations of the corresponding stimulus events. The system then projects gazes, based on the trial eye model, corresponding to the remaining unselected interaction observations, and performs a consistency check.

To perform this consistency check (e.g., RANSAC), the system can detect inliers, such as the interaction observation corresponding to event location 830, for which the distance from the projected gaze to the stimulus event falls within a threshold value. Likewise, the system can detect outliers, such as the interaction observations corresponding to event locations 820 and 840, for which the respective distance exceeds the threshold value. Based on a ratio of the number of inliers to outliers, the system can decide to update the eye model parameters, such as by replacing the eye model with the trial eye model. In an embodiment, the system updates the eye model based on the selected interaction observations corresponding to event locations 810 and 850. Further details of an example consensus check process are described below in the flow corresponding to FIG. 11. Note that FIG. 8 is for illustrative purposes; the system need not actually display the projected gaze, but rather determines the projected locations of the gaze based on the trial eye model in order to determine their proximity.

In a typical example, the system can accumulate up to fifty interaction observations before generating the update decision. While the system can perform calibration with as few as three interaction observations, it may be preferable to accumulate more, such as ten or even 20. However, note that the computational burden of calibration can increase if the number of stored interaction observations becomes too high.

FIGS. 9-12 illustrate example flows for generating and using interaction observations in support of continuous calibration of an eye tracking system such as the eye tracking system 400, in accordance with embodiments. An eye tracking system is described as performing the operations of the example flows. Nonetheless, the embodiments are not limited as such. The embodiments similarly apply to a remote computer system that can receive information about user gaze and stimulus events from the eye tracking system, to then generate interaction observations and update an eye model, and send the updated eye model to the eye tracking system, thereby recalibrating the eye tracking system. In another example, the recalibration can be distributed between the eye tracking system and the remote computer system (e.g., the eye tracking system may host the interaction observation and/or user gaze record, while the eye tracking system may host the consensus check module).

Instructions for performing the operations of the illustrative flows can be stored as computer-readable instructions on a non-transitory computer-readable medium of the eye tracking system. As stored, the instructions represent programmable modules that include code or data executable by a processor(s) of the eye tracking system. The execution of such instructions configures the eye tracking system to perform the specific operations shown in the figure and described herein. Each programmable module in combination with the processor represents a means for performing a respective operation(s). While the operations are illustrated in a particular order, it should be understood that no particular order is necessary and that one or more operations may be omitted, skipped, and/or reordered.

Figure 9:
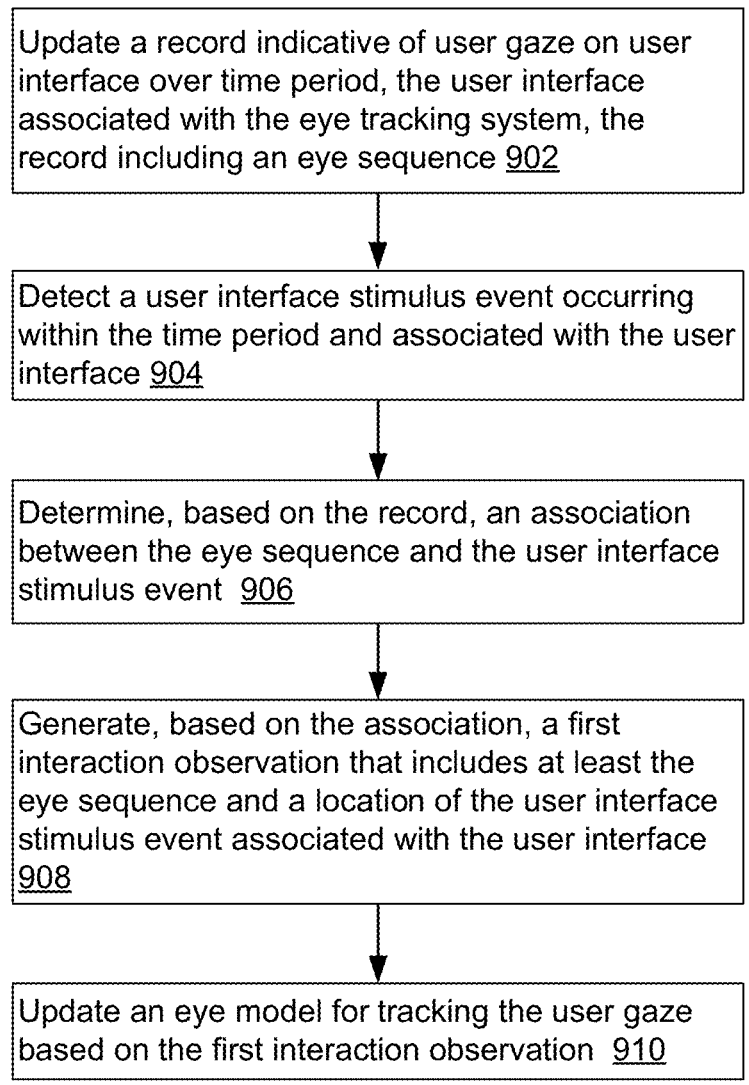
FIG. 9 illustrates an example flow for calibrating an eye tracking system, in accordance with an embodiment.

FIG. 9 illustrate an example flow for calibrating the eye, in accordance with an embodiment. The example flow starts at operation 902, where the eye tracking system updates a record indicative of a user gaze on a user interface over a time period. The user interface can be associated with the eye tracking system, and can include a 2D computer screen or 3D display such as a VR or AR headset, as discussed previously. The user gaze record can include one or more eye sequences of the user, such as eye fixations and/or eye movements. This record can be a buffer maintained in transitory or non-transitory memory or storage, for example circular buffer 600 shown in FIG. 6. In an embodiment, the time period corresponding to the buffer's size can depend on the type of application presenting the user interface stimulus event. For example, if the user engages with a software application or online streaming site to view video clips or animations, the buffer may be comparable in length to the clips or scenes therein. On the other hand, if the user engages with image editing software calling for frequent mouse clicks, the buffer may be a few seconds long. In an embodiment, the record of the user gaze includes timestamps or confidence measures.

At operation 904, the eye tracking system detects a user interface stimulus event occurring within the time period and associated with the user interface. For example, the user interface stimulus event can include a user-initiated or displayed event that would typically attract the user's gaze, such as: a user mouse click; a user screen tap; a user selection; a user keyboard input; a user joystick or game pad input; a user hand controller input; a displayed cursor; a displayed icon; a displayed notification; and/or a displayed animation. Because such events are expected to attract the user's gaze, the calibration system can use them to increase confidence in identifying the location of the user's gaze. In various embodiments, the user interface stimulus event can have a 2D location, e.g. on a computer screen, or a 3D location, e.g. displayed by a VR or AR headset.

At operation 906, the eye tracking system determines, based on the record, an association between the eye sequence and the user interface stimulus event. In a typical example, the stimulus event can be an event in the user interface (UI) that attracts the user's gaze (e.g., an animation or motion in a video game), or a user input event that requires the user's attention (e.g., a mouse click or typing). Thus, the association would typically reflect a cause-and-effect relationship between the stimulus and eye sequence. For example, the system can determine the association based on the relative timing of the stimulus and eye sequence, as in the examples of FIGS. 7B and 7C, and described below in the flow corresponding to FIG. 10.

At operation 908, the eye tracking system generates, based on the association, a first interaction observation that includes at least the eye sequence and the location of the user interface stimulus event associated with the user interface. At operation 910, the eye tracking system updates an eye model for tracking the user gaze based on the first interaction observation. Note that in various embodiments, the eye model can include: parameters of an eye model such as PCCR; a set of machine learning or deep learning parameters such as a deep neural network, deep belief network, or recurrent neural network; or parameters of any other model now known or later developed.

In particular, updating the eye model can involve recalibration, which can be based on the assumption that the user's gaze is aimed at the location of the associated stimulus event within the same interaction observation. Note that in some examples, updating the eye model may not actually involve adopting a proposed set of model parameters, either because the proposed model is found to be inconsistent, because it is too similar to an existing model, or because the proposed model is "mixed" or otherwise combined with the existing model.

In an embodiment, updating the eye model can be based on an eye model update decision and/or update check, which can be made according to a consensus algorithm applied to interaction observations. In further embodiments, the eye model update decision and/or update check can be based on one or more of: Random Sample Consensus (RANSAC); Maximum Likelihood Estimate Sample Consensus (MLE-SAC); Maximum A Posteriori Sample Consensus (MAPSAC); a KALMANSAC procedure; and machine learning. Details of an example consensus procedure for updating the eye model will be described below in the flow corresponding to FIG. 11.

Figure 10:
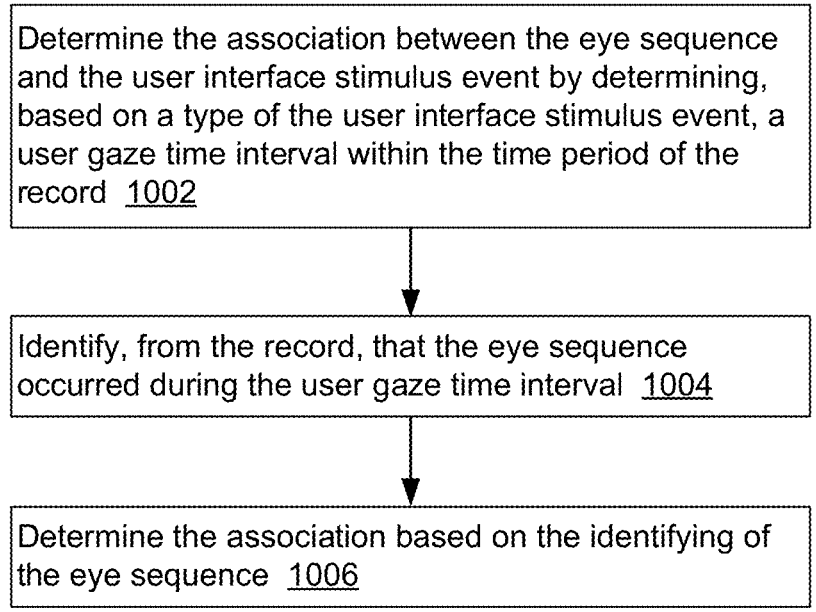
FIG. 10 illustrates an example flow for determining an association between an eye sequence and a user interface stimulus event, in accordance with an embodiment.

FIG. 10 illustrates an example flow for determining an association between an eye sequence and a user interface stimulus event, in accordance with an embodiment. This flow provides exemplary further details for operation 906 corresponding to FIG. 9. The example flow starts at operation 1002, where the eye tracking system determines, based on a type of a user interface stimulus event, a user gaze time interval within the time period of the record. Such a user gaze time interval can be a subset within the time period of the record during which the user's eye sequence is expected to follow the user interface stimulus event. Depending on the type of the user interface stimulus event, this user gaze time interval can precede, coincide with, and/or follow the user interface stimulus event. For example, as in FIG. 7B, the user's eye sequence is expected to coincide with an extended stimulus event, such as a video clip or animation sequence. As in the example of FIG. 7C, the user's eye sequence can precede a user-initiated event such as a mouse click. At operation 1004, the eye tracking system identifies, from the user gaze record, that the eye sequence occurred during the user gaze time interval. At operation 1006, the eye tracking system determines the association based on the identifying of the eye sequence. In some embodiments, instead of or in addition to timing, the system determines the association based on a stimulus activation, relative locations of the stimulus and sequence, precision during the eye sequence, or correlating movement, as described above.

Figure 11:
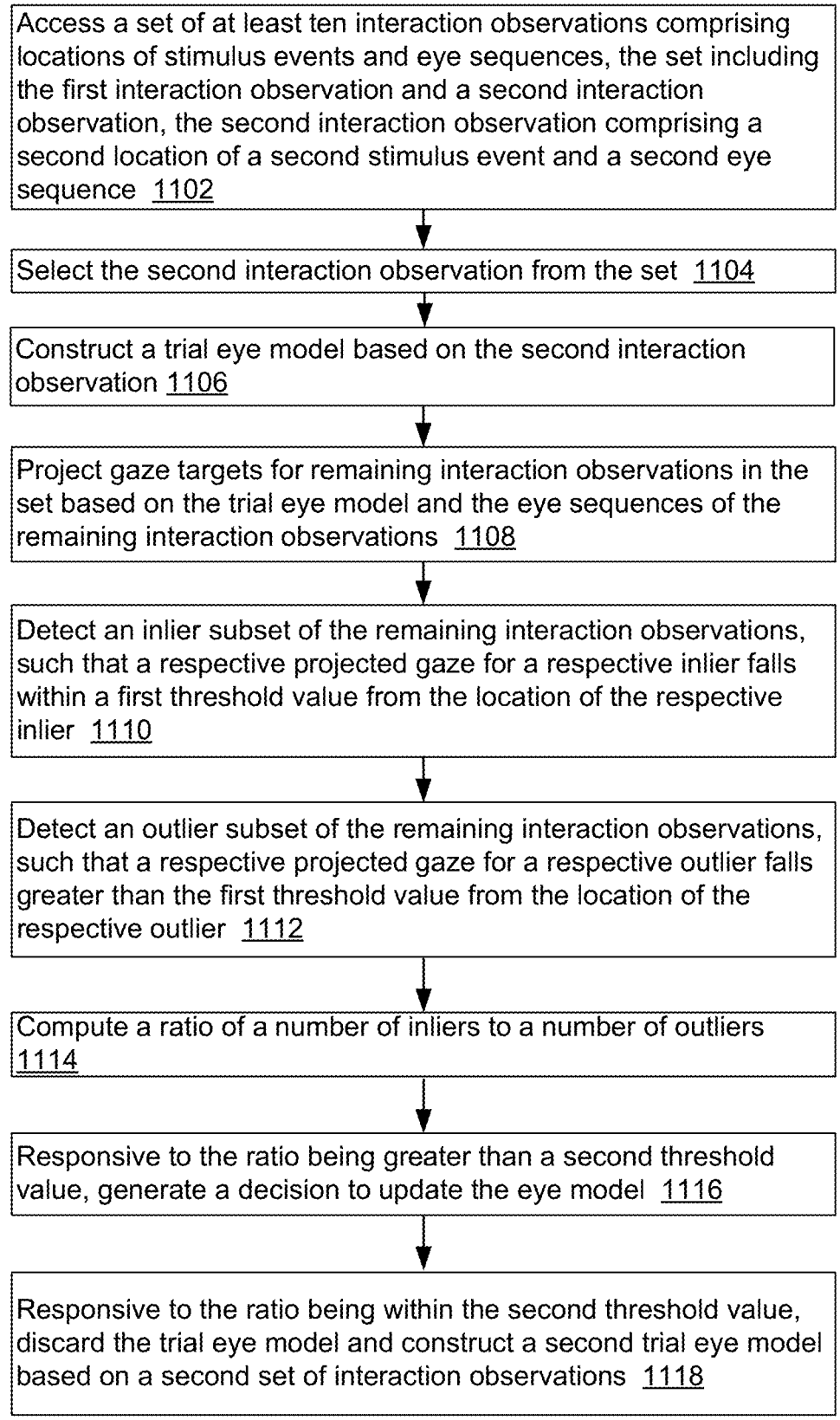
FIG. 11 illustrates an example flow for generating a personal calibration parameter update decision, in accordance with an embodiment.

FIG. 11 illustrates an example flow for generating an eye model update decision, in accordance with an embodiment. This flow provides exemplary further details for updating the eye model in operation 910 corresponding to FIG. 9. The flow proceeds by constructing a trial eye model and deciding whether to update the eye model based on the trial eye model.

The example flow starts at operation 1102, where the eye tracking system accesses a set of interaction observations comprising locations of stimulus events and eye sequences. In various embodiments, the set includes at least four interaction observations, or can include more or fewer interaction observations. The set can include the first interaction observation (as generated in operation 908 corresponding to FIG. 9) and a second interaction observation, the second interaction observation comprising a second location of a second stimulus event and a second eye sequence. At operation 1104, the eye tracking system selects the second interaction observation from the set. At operation 1106, the eye tracking system constructs a trial eye model based on the second interaction observation, such that a gaze target projected for the second eye sequence by applying the trial eye model falls proximate to the second location of the second stimulus event. Proximate refers to being aligned (e.g., the same location) or a distance from each other less than a predefined proximity threshold (e.g., less than ten pixels away from each other, less than 0.25 cm away from each other, or other measures that depend on a targeted accuracy for gaze detection by the eye tracking system). In an embodiment, the eye tracking system can construct the trial eye model such that both the first and second interaction observations are proximate. For example, both the first and second interaction observations can have projected gazes that fall within a predefined proximity threshold from the corresponding locations.

At operation 1108, the eye tracking system determines projected gaze targets for remaining interaction observations in the set based on the trial eye model and the eye sequences of the remaining interaction observations. At operation 1110, the eye tracking system detects an inlier subset of the remaining interaction observations, such that a respective projected gaze for a respective inlier falls within a first threshold value from the location of the respective inlier, as in the example of FIG. 8. At operation 1112, the eye tracking system detects an outlier subset of the remaining interaction observations, such that a respective projected gaze for a respective outlier falls greater than the first threshold value from the location of the respective outlier, as in the example of FIG. 8. At operation 1114, the eye tracking system computes a ratio of a number of inliers to a number of outliers.

If the computed ratio is large enough, the system can determine that the trial eye model is an acceptable candidate for updating the existing model. At operation 1116, responsive to the ratio being greater than a second threshold value, the eye tracking system generates a decision to update the eye model. In an embodiment, updating the eye model can involve replacing the eye model with the trial eye model.

Alternatively, updating the eye model can involve adopting the trial eye model contingent on some condition, such as the trial model differing sufficiently from the existing eye model. That is, after determining in that the trial eye model is acceptable, the system can determine whether it is worthwhile to update the model (e.g., based on whether the trial eye model is substantially different from the existing model). In particular, the eye model update decision in operation 1116 can be part of a consensus algorithm to select reliable interaction observations, and can be based on a measure of confidence (such as the inlier to outlier ratio) that the trial eye model is consistent with a number of observed interaction observations. On the other hand, adopting the trial eye model can be based on a comparison to the existing model. For example, the system can determine a difference between the trial eye model and the eye model (for example, a change to the pupil size between the two models), and responsive to the difference being greater than a third threshold value, replace the eye model with the trial eye model. Responsive to the difference being within the third threshold value, the system can keep the eye model.

At operation 1118, responsive to the ratio being within the second threshold value, the eye tracking system discards the trial eye model and constructs a second trial eye model based on a second set of interaction observations.

Figure 12:
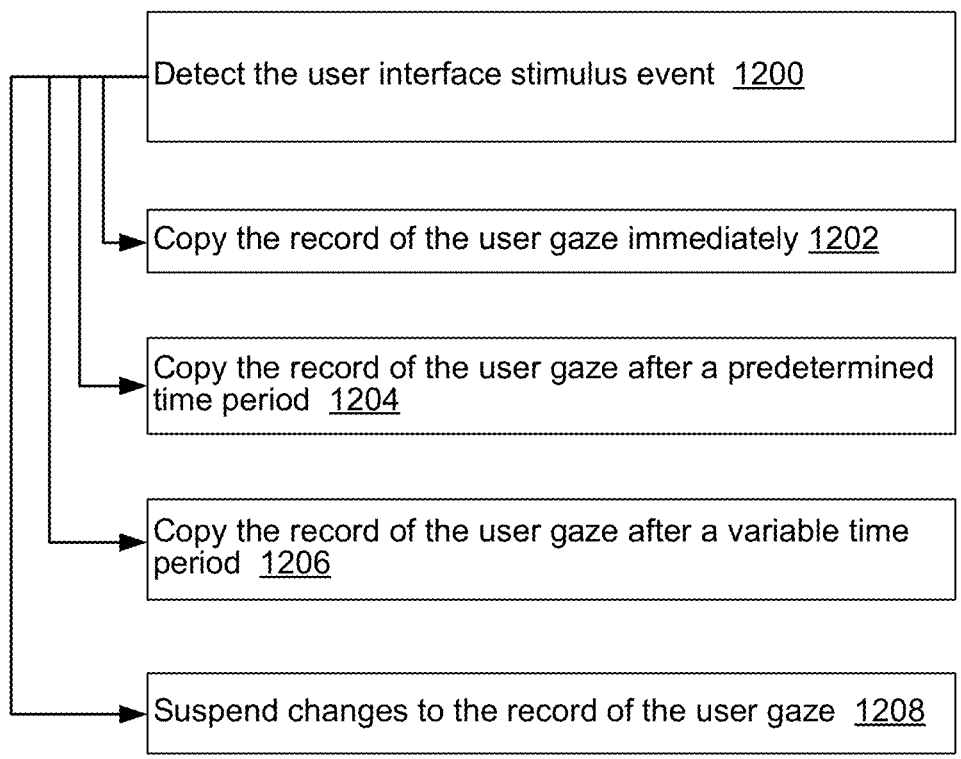
FIG. 12 illustrates alternative example flows for copying a record of a user gaze after detecting a user interface stimulus event, according to embodiments.

FIG. 12 illustrates alternative example flows for copying a record of a user gaze after detecting a user interface stimulus event, according to embodiments. As shown, at operation 1202, the eye tracking system can copy the record of the user gaze immediately. Alternatively, at operation 1204, the eye tracking system can copy the record of the user gaze after a predetermined time period, such as 1 minute or 2 minutes. Alternatively, at operation 1206, the eye tracking system can copy the record of the user gaze after a variable time period. Alternatively, at operation 1208, the eye tracking system can suspend changes to the record of the user gaze.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A method for calibrating an eye tracking system, the method performed by the eye tracking system and comprising:

updating a record indicative of a user gaze on a user interface over a time period, the user interface associated with the eye tracking system, the record including an eye sequence;

detecting a user interface stimulus event occurring within the time period and associated with the user interface;

determining, based on the record, an association between the eye sequence and the user interface stimulus event;

generating, based on the association, a first interaction observation that includes at least the eye sequence and a location of the user interface stimulus event associated with the user interface;

updating personal calibration parameters for tracking the user gaze based on the first interaction observation, and generating a personal calibration parameter update decision by;

accessing a set of at least four interaction observations comprising locations of stimulus events and eye sequences, the set including the first interaction observation and a second interaction observation, the second interaction observation comprising a second location of a second stimulus event and a second eye sequence;

selecting the second interaction observation from the set;

constructing trial personal calibration parameters based on the second interaction observation, such that a gaze target projected for the second eye sequence using the trial personal calibration parameters falls proximate to the second location;

projecting gaze targets for remaining interaction observations in the set based on the trial personal calibration parameters and the eye sequences of the remaining interaction observations;

detecting an inlier subset of the remaining interaction observations, such that a respective projected gaze for a respective inlier falls within a first threshold value from the location of the respective inlier;

detecting an outlier subset of the remaining interaction observations, such that a respective projected gaze for a respective outlier falls greater than the first threshold value from the location of the respective outlier;

computing a ratio of a number of inliers to a number of outliers; and responsive to the ratio being greater than a second threshold value, generating a decision to update the personal calibration parameters; and responsive to the ratio being within the second threshold value, discarding the trial personal calibration parameters and constructing second trial personal calibration parameters based on a second set of interaction observations.

2. The method of claim 1, wherein determining the association between the eye sequence and the user interface stimulus event comprises:

determining, based on a type of the user interface stimulus event, a user gaze time interval within the time period of the record;

identifying, from the record, that the eye sequence occurred during the user gaze time interval; and determining the association based on the identifying of the eye sequence.

3. The method of claim 2, wherein determining the user gaze time interval comprises:

determining, based on a type of the application, an expected type of candidate user interface stimulus events; and determining that the type of the user interface stimulus event is the expected type.

4. The method of claim 1, further comprising generating a personal calibration parameter update decision by performing an update check using the first interaction observation, the update check comprising one or more of:

Random Sample Consensus (RANSAC);
Maximum Likelihood Estimate Sample Consensus (MLESAC);
Maximum A Posteriori Sample Consensus (MAPSAC);
a KALMANSAC procedure; and
machine learning.

5. The method of claim 1, wherein updating the personal calibration parameters comprises:

determining a difference between the trial personal calibration parameters and the personal calibration parameters;

responsive to the difference being greater than a third threshold value, replacing the personal calibration parameters with the trial personal calibration parameters; and responsive to the difference being within the third threshold value, keeping the personal calibration parameters.

6. The method of claim 1, wherein the user interface stimulus event includes one or more of:

a user mouse click;
a user screen tap;
a user selection;
a user keyboard input;
a user joystick or game pad input;
a user hand controller input;
a displayed cursor;
a displayed icon;
a displayed notification; and
a displayed animation.

7. The method of claim 1, wherein detecting the user interface stimulus event occurring within the time period further comprises:

accessing a list of expected events corresponding to an underlying application implemented on the user interface by a computing device separately from the eye tracking system; and detecting that the user interface stimulus event matches an expected event in the list.

8. The method of claim 1, wherein:

the nature of the user interface stimulus event is dynamic;

the nature being dynamic denotes the user interface stimulus event has a motion or a displayed animation originating in the user interface; and determining the association between the eye sequence and the user interface stimulus event further comprises identifying that a pattern of movement of the eye sequence corresponds to a similar pattern of the motion or the displayed animation.

9. The method of claim 1:

further comprising generating a personal calibration parameter update decision based on:

a plurality of interaction observations including the first interaction observation; and a consistency among a plurality of eye model parameter fits for the plurality of interaction observations or a distance between respective stimulus events and eye sequence locations of the plurality of interaction observations; and wherein updating the personal calibration parameters is based on the personal calibration parameter update decision.

10. A non-transitory computer-readable storage medium storing instructions, that upon execution on a computer system, cause the computer system to perform a method for calibrating an eye tracking system, the method comprising:

updating a record indicative of a user gaze on a user interface over a time period, the user interface associated with the eye tracking system, the record including an eye sequence;

detecting a user interface stimulus event occurring within the time period and associated with the user interface;

determining, based on the record, an association between the eye sequence and the user interface stimulus event;

generating, based on the association, a first interaction observation that includes at least the eye sequence and a location of the user interface stimulus event associated with the user interface;

updating personal calibration parameters for tracking the user gaze based on the first interaction observation, and generating a personal calibration parameter update decision by;

accessing a set of at least four interaction observations comprising locations of stimulus events and eye sequences, the set including the first interaction observation and a second interaction observation, the second interaction observation comprising a second location of a second stimulus event and a second eye sequence;

selecting the second interaction observation from the set;

constructing trial personal calibration parameters based on the second interaction observation, such that a gaze target projected for the second eye sequence using the trial personal calibration parameters falls proximate to the second location;

projecting gaze targets for remaining interaction observations in the set based on the trial personal calibration parameters and the eye sequences of the remaining interaction observations;

detecting an inlier subset of the remaining interaction observations, such that a respective projected gaze for a respective inlier falls within a first threshold value from the location of the respective inlier;

detecting an outlier subset of the remaining interaction observations, such that a respective projected gaze for a respective outlier falls greater than the first threshold value from the location of the respective outlier;

computing a ratio of a number of inliers to a number of outliers; and responsive to the ratio being greater than a second threshold value, generating a decision to update the personal calibration parameters; and responsive to the ratio being within the second threshold value, discarding the trial personal calibration parameters and constructing second trial personal calibration parameters based on a second set of interaction observations.

11. The non-transitory computer-readable storage medium of claim 10, wherein determining the association between the eye sequence and the user interface stimulus event comprises:

determining, based on a type of the user interface stimulus event, a user gaze time interval within the time period of the record;

identifying, from the record, that the eye sequence occurred during the user gaze time interval; and determining the association based on the identifying of the eye sequence.

12. The non-transitory computer-readable storage medium of claim 10, wherein the location of the associated stimulus event is two-dimensional or three-dimensional.

13. The non-transitory computer-readable storage medium of claim 10, wherein the record is stored in a circular buffer.

14. The non-transitory computer-readable storage medium of claim 13, wherein a size of the circular buffer depends on a type of application presenting the user interface stimulus event.

15. An eye tracking system, comprising:

a camera;

a processor; and a memory storing computer-readable instructions that, upon execution by the processor, cause the eye tracking system to perform a method for calibrating the eye tracking system, the method comprising:

updating a record indicative of a user gaze on a user interface over a time period, the user interface associated with the eye tracking system, the record including an eye sequence;

detecting a user interface stimulus event occurring within the time period and associated with the user interface;

determining, based on the record, an association between the eye sequence and the user interface stimulus event;

generating, based on the association, a first interaction observation that includes at least the eye sequence and a location of the user interface stimulus event associated with the user interface;

updating personal calibration parameters for tracking the user gaze based on the first interaction observation, and generating a personal calibration parameter update decision by;

accessing a set of at least four interaction observations comprising locations of stimulus events and eye sequences, the set including the first interaction observation and a second interaction observation, the second interaction observation comprising a second location of a second stimulus event and a second eye sequence;

selecting the second interaction observation from the set;

constructing trial personal calibration parameters based on the second interaction observation, such that a gaze target projected for the second eye sequence using the trial personal calibration parameters falls proximate to the second location;

projecting gaze targets for remaining interaction observations in the set based on the trial personal calibration parameters and the eye sequences of the remaining interaction observations;

detecting an inlier subset of the remaining interaction observations, such that a respective projected gaze for a respective inlier falls within a first threshold value from the location of the respective inlier;

detecting an outlier subset of the remaining interaction observations, such that a respective projected gaze for a respective outlier falls greater than the first threshold value from the location of the respective outlier;

computing a ratio of a number of inliers to a number of outliers; and responsive to the ratio being greater than a second threshold value, generating a decision to update the personal calibration parameters; and responsive to the ratio being within the second threshold value, discarding the trial personal calibration parameters and constructing second trial personal calibration parameters based on a second set of interaction observations.

16. The eye tracking system of claim 15, wherein determining the association between the eye sequence and the user interface stimulus event further comprises one or more of the following:
- identifying, from the record, that the user gaze was stable during an eye fixation time interval within the time period of the record; or
- identifying, from the record, that a pattern of movement of the eye sequence corresponded to a similar movement pattern of the user interface stimulus event.

17. The eye tracking system of claim 15, wherein updating the personal calibration parameters comprises generating the personal calibration parameters without performing an initial calibration.

18. The eye tracking system of claim 15, wherein
- detecting the user interface stimulus event further comprises one or more of:
- copying the record of the user gaze to a storage immediately for later analysis;
- copying the record of the user gaze to a storage after a predetermined time period for later analysis;
- copying the record of the user gaze to a storage after a variable time period for later analysis; or
- suspending changes to the record of the user gaze.

19. The eye tracking system of claim 15, wherein determining the association between the eye sequence and the user interface stimulus event is based on one or more of:
- a distance from the location of the stimulus event to a projected gaze for the eye sequence;
- a duration of the eye sequence;
- a precision of tracking the eye sequence; or
- a correlated movement within the eye sequence.

\* \* \* \* \*